United States Patent [19]

Boddy

[11] Patent Number: 4,827,979

[45] Date of Patent: May 9, 1989

[54] MULTI PORT DIVERTER VALVE

[76] Inventor: Jerold W. Boddy, 159 Brightwoods La., Rochester, N.Y. 14623

[21] Appl. No.: 226,319

[22] Filed: Jul. 28, 1988

[51] Int. Cl.$^4$ .................... B01D 27/10; F16K 11/044
[52] U.S. Cl. .............................. 137/625.29; 137/599.1; 210/341
[58] Field of Search ....................... 137/625.29, 625.48, 137/595, 599.1; 251/357, 360; 210/340, 341

[56] References Cited

U.S. PATENT DOCUMENTS

| | | | |
|---|---|---|---|
| 1,400,424 | 12/1921 | Derby | 137/599.1 |
| 1,919,031 | 7/1933 | Muhleisen | 210/341 |
| 2,471,951 | 5/1949 | Granberg | 137/625.29 X |
| 2,921,687 | 1/1960 | Jenkins | 137/599.1 X |
| 3,137,476 | 6/1964 | Rotheraine et al. | 251/357 |
| 3,183,933 | 5/1965 | Whitlock et al. | 137/624.18 |
| 3,411,538 | 11/1968 | Gruner et al. | 137/625.29 |
| 3,521,673 | 7/1970 | Gruner et al. | 137/625.29 |
| 3,580,284 | 5/1971 | Bini et al. | 137/595 X |
| 3,613,731 | 10/1971 | Whitlock | 137/625.29 |
| 3,867,960 | 2/1975 | Hosoda et al. | 137/625.29 |
| 3,900,401 | 8/1975 | Oliver et al. | 210/341 X |
| 3,935,108 | 1/1976 | Forgues | 137/599.1 X |
| 4,112,974 | 9/1978 | Davis et al. | 137/625.29 |
| 4,286,624 | 9/1981 | Clausen et al. | 137/625.29 |
| 4,573,497 | 3/1986 | White | 137/625.29 |

Primary Examiner—John Rivell
Attorney, Agent, or Firm—Fred L. Denson

[57] ABSTRACT

A multi port diverter valve is described which contains a series of compartments and a common valve stem which passes through each of the compartments. A series of blocking elements are mounted on the valve stem and block the flow of fluid between compartments when positioned in corresponding ports. The positive shut off of fluid prevents leakage around the blocking element.

6 Claims, 3 Drawing Sheets

MULTI PORT DIVERTER VALVE

BACKGROUND OF THE INVENTION

1. Field of the Invention

The present invention relates to a flow control valve, and more specifically to a multi port diverter valve used in fluid processing operations.

2. Description of the Prior Art

There is a wide variety of valves in the prior art that are used to divert the flow of fluids. Many of these valves are complex in structure and operation or have many moving parts. U.S. Pat. Nos. 3,613,731, 3,867,960, 4,112,974, 4,286,624 and 4,573,497 are typical in this regard. Such valves can be relatively expensive to produce and maintain. Other valves which are less complex, such as those which have reciprocating stems, are subject to accelerated wear because of the metal to metal contact between stem and sleeve. Repeated use causes the parts of valves of this type to become worn, leaky and otherwise inefficient. Valves having specially contoured surfaces are particularly prone to leakage after some degree of wear because of the close tolerances between the various parts. Typical valves having reciprocating stems are described in U.S. Pat. Nos. 3,183,933, 3,411,538 and 3,521,673. While these types of valves require less frequence maintenance, the configuration of the internal moving parts calls for replacement of their entire valve stems and related parts during maintenance activities. Such valves are subject to continued inefficient operation even after maintenance is completed if the valve ports and passages are not carefully aligned or part tolerances are improper. Thus, the proper performance of maintenance on valves of this type can require considerable equipment down time. Moreover, relatively complex control systems are often required to automate such valves, which in turn increases the maintenance costs.

There is a clearly defined need for a diverter valve which is economic, efficient and requires little maintenance. There is also a need for a diverter valve which requires replacement of a minimum number of parts during routine maintenance, has a positive shut off of leakage between the operating sides of the valve and which is readily automated.

SUMMARY OF THE INVENTION

In accordance with the present invention, a multi port diverter valve is provided which is economic to manufacture, efficient to operate, provides a tight seal against leaks, is readily automated and requires low maintenance. The valve, which has a minimum number of moving parts, is useful in conjuntion with fluid processing or controlling equipment such as heat exchangers and filtration equipment. It is particularly useful in continuous flow operations where equipment down time is not permitted. In such cases, the valve is useful for quickly and conveniently diverting fluid flow to alternate processing systems without interrupting fluid flow. Typically, it is used to divert flow to a secondary or back up system when a primary system is shut down for maintenance purposes.

The diverter valve contains a fluid intake chamber and a fluid discharge chamber. Each chamber includes three compartments which are separated by a chamber dividing wall. Each compartment, in turn, has two ports, one in the side wall and one in the chamber dividing wall. The center compartment in each chamber has an additional port for the initial entry and final discharge of fluid to and from the valve. A valve stem extends the length of the valve and contains two blocking elements which are preferably plugs. The plugs are axially mounted on the valve stem and are situated within the center compartment of each chamber. Reciprocal movement of the valve stem causes two compartments in each chamber to be opened while the remaining compartment in each chamber is sealed. This permits fluid entering the center compartment of the intake chamber to be diverted through the open port to an adjacent compartment and thereafter to be directed to the fluid processing equipment. When the fluid returns to the valve and enters its fluid discharge chamber, it passes through an end compartment, through an open port in the chamber dividing wall, into the center compartment and thereafter is discharged through an outlet port. When the valve stem is repositioned, the fluid flow is redirected through compartments that were previously sealed off by the valve plugs. It is then directed into and through the secondary equipment, back through the diverter valve and subsequently is discharged without any disruption in fluid flow.

The invention and its objects and advantages will become more apparent by referring to the accompanying drawings and to the ensuing detailed description of the preferred embodiment.

DESCRIPTION OF THE PREFERRED EMBODIMENTS

Figure 1:
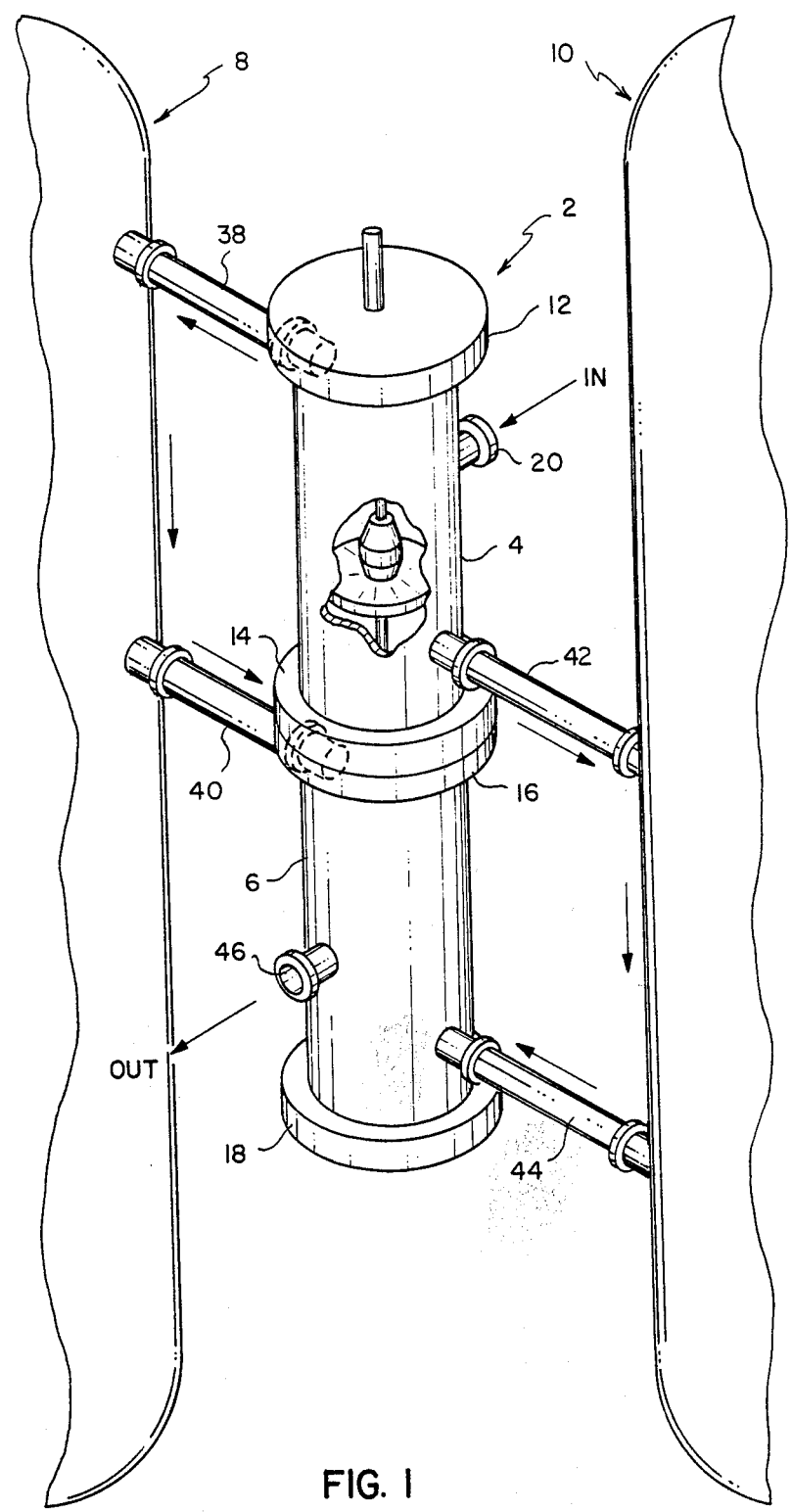
FIG. 1 is a perspective view of the multi port diverter valve of this invention as connected to other fluid processing equipment.
Figure 2:
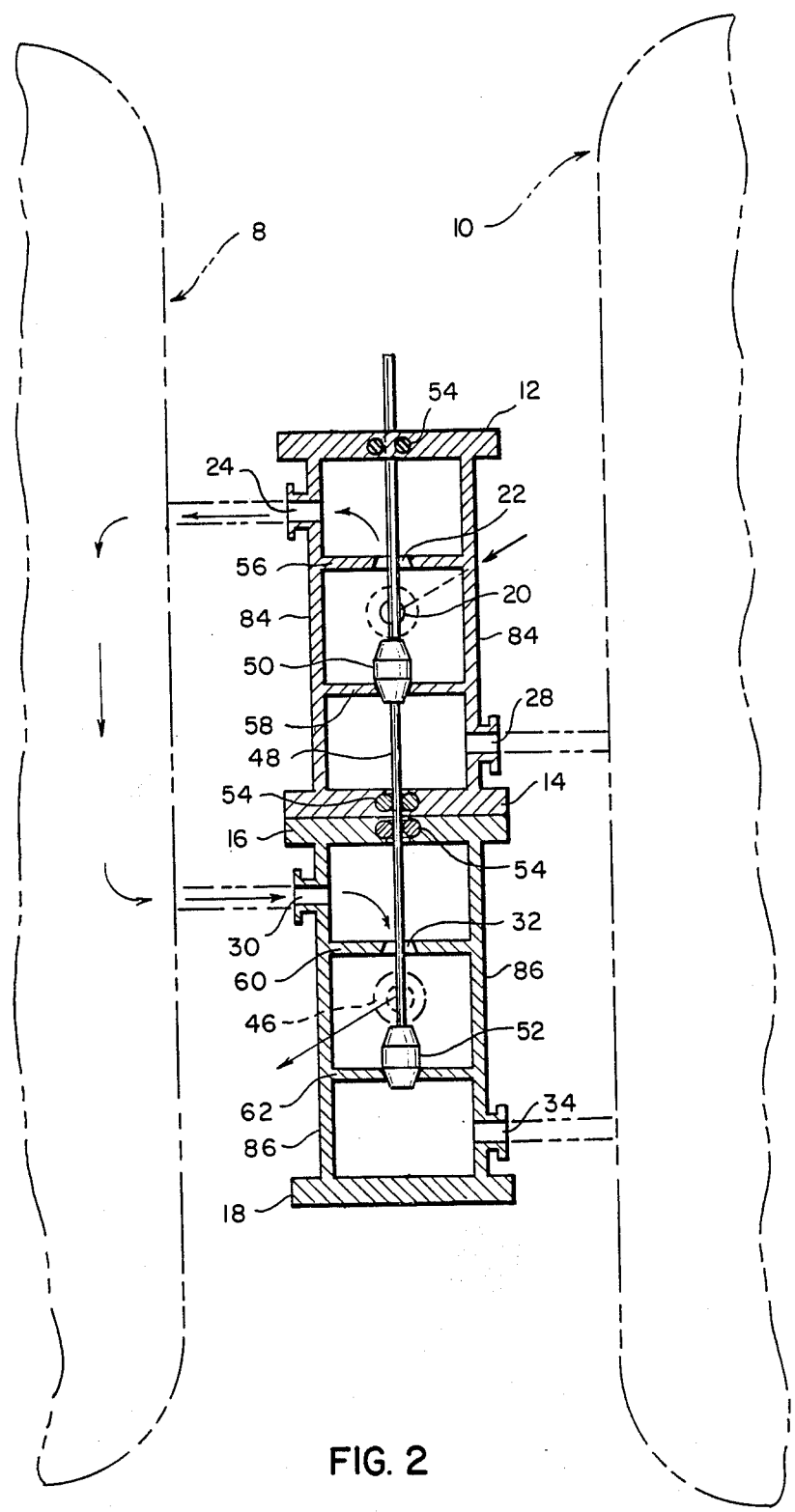
FIG. 2 is a front sectional view of the multi port diverter valve showing the valve in one of its operable positions.
Figure 3:
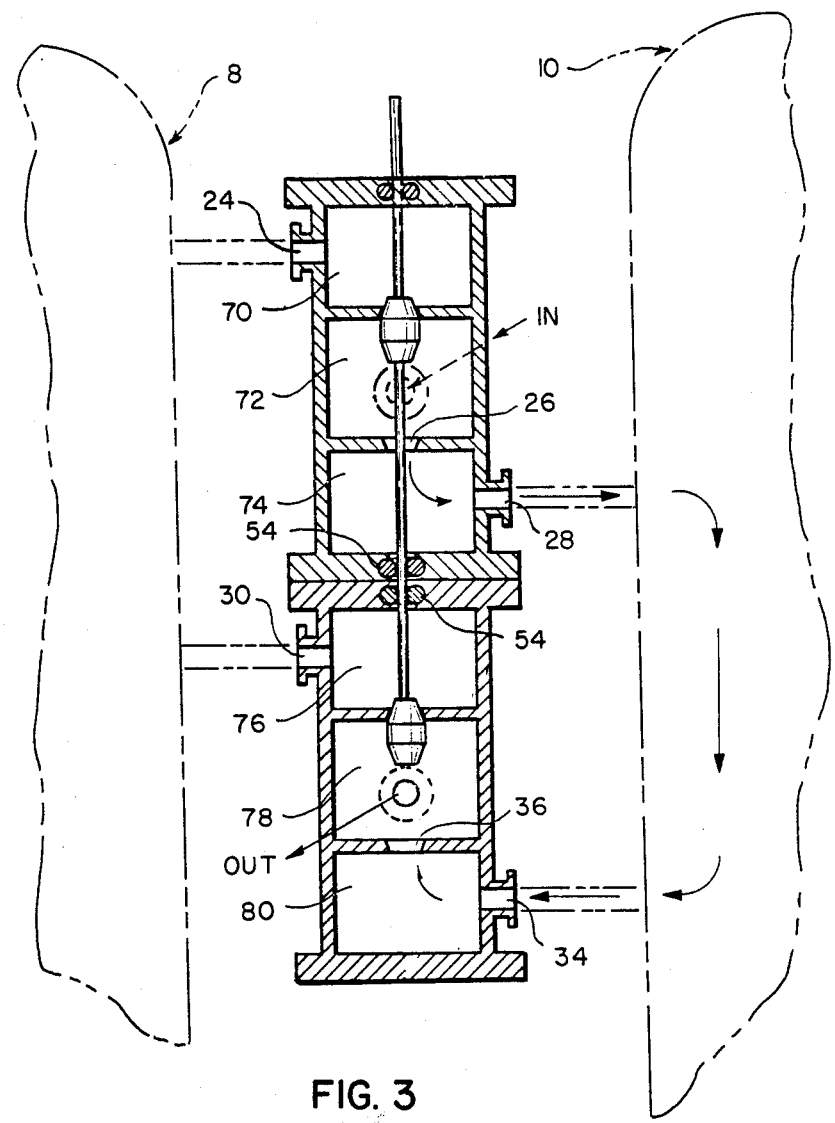
FIG. 3 is a front sectional view of the multi port diverter valve showing the valve in another operable position.

Referring to FIGS. 1, 2 and 3, the multi port diverter valve is generally designated 2. The valve controls the flow of fluid to primary and secondary fluid processing or distribution equipment, 8 and 10 respectively, such as heat exchangers, filter, and the like. The diverter valve includes fluid intake chamber 4 and fluid discharge chamber 6. Fluid intake chamber 4 is cylindrical in shape and includes side wall 84 and end covers 12 and 14. It has two outlet ports 24 and 28 and one inlet port 20. Three separate compartments, 70, 72, and 74 are positioned in fluid intake chamber 4. Compartment 70 is enclosed by side wall 84, end cover 12 and chamber dividing wall 56. Compartment 72 is enclosed by side wall 84 and chamber dividing walls 56 and 58. Compartment 74 is enclosed by side wall 84, chamber dividing wall 58 and end cover 14. Fluid discharge chamber 6 also is cylindrical in shape and includes side wall 86 and two end covers 16 and 18. It has two inlet ports 30 and 34 and one outlet port 46. It also contains three separate compartments, 76, 78 and 80. Compartment 76 is enclosed by side wall 86, end cover 16 and chamber dividing wall 60. Compartment 78 is enclosed by chamber dividing walls 60 and 62 and side wall 86. Compartment 80 is enclosed by chamber wall 62, end cover 18 and side wall 86. Each of the chamber dividing walls 56, 58, 60 and 62 contains a port, 22, 26, 32 and 36.

A common valve stem 48 is situated in each compartment of each chamber. End covers 12, 14 and 16 contain apertures for stem 48. "O" rings 54 are positioned in the apertures to provide support for stem 48 and to prevent fluid leakage. One end of valve stem 48 is attached to means for imparting and controlling a reciprocal movement to the stem 48. Such means are conventional and include hydraulic, electronic or manual operated reciprocal motors commonly used in conjunction with control valves. Two valve blocking elements such as plugs 50 and 52 are axially and detachably mounted on stem 48. One of the plugs 50 is axially mounted on the portion of the stem situated in compartment 72 of the fluid intake chamber while the other plug 52 is axially mounted in compartment 78 of fluid discharge chamber 6.

Figure 4:
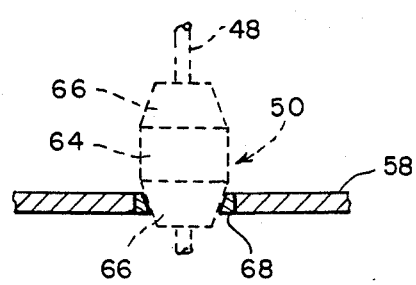
FIG. 4 is a front sectional view of a chamber dividing wall with a valve plug seated in its port.

The valve blocking element is any shape or design. A plug type element is particularly effective. As shown in FIG. 4, plug 50 includes cylindrical plug body 64 and tapered ends 66. The ports in the chamber dividing walls are tapered so as to provide a mated seat 68 for tapered plug end 66. In one embodiment of this invention, seat 68 is detachably mounted in its corresponding port and is removable therefrom so that it can be conveniently replaced during routine maintenance. In another embodiment, tapered end 66 is detachable from plug body 64 and comprises a removable ring which can be easily replaced during periodic valve maintenance. Valve plug 50 and seat 68 are made from any suitable material which is not effected by the fluid passing through the valve such as non corrosive metals and alloys which do not react with the treated fluid, inert elastomeric materials and the like. Teflon and Buna rubber are particularly suitable for this purpose.

When the primary fluid processing equipment 8 is in use and the secondary fluid processing equipment 10 is shut down, the operation of diverter valve 2 is depicted in FIG. 2. Fluid enters compartment 72 of fluid intake chamber 4 through inlet port 20. Valve stem 48 is positioned such that compartment 74 is sealed closed by the seating of plug 50 in dividing wall port 26. In this condition, positive shutoff is provided which prevents fluid leakage to secondary equipment 10. The fluid passes from compartment 72, through dividing wall port 22 which is open, through compartment 70, through outlet 24 and conduit 38 to fluid processing equipment 8. The fluid is discharged after it is processed in equipment 8 to conduit 40 and returned to the discharge chamber 6 of diverter valve 2. It reenters diverter valve 2 at inlet port 30 and passes through compartment 76, through open dividing wall port 32 and into compartment 78. Valve stem 48 is positioned such that plug 52 is seated in dividing wall port 36 to close off compartment 80. This positive shut off again precludes leakage of fluid into compartment 80 and secondary equipment 10. The fluid passes from compartment 78 and is discharged through outlet port 46.

In continuous operations, the primary fluid processing quipment 8 can be removed from service for maintenance or other pruposes and the secondary equipment 10 can be placed in operation without any down time or loss of continuity. This is accomplished as shown in FIG. 3 where the valve stem 48 is repositioned by electronic, hydraulic or manual control means. In this configuration, plug 50 seals off compartment 70 and plug 52 seals off compartment 76 by the plugs being re-seated in corresponding ports 22 and 32 contained in the dividing walls, 56 and 60 for these compartments thereby providing positive shut off. Fluid enters compartment 72 through inlet port 20. Thereafter, it flows through dividing wall port 26, compartment 74, outlet port 28 and conduit 42 to the secondary fluid processing equipment 10. Upon discharge from quipment 10, it passes through conduit 44 and reenters compartment 80 of the fluid discharge chamber 6 of diverter valve 2 through inlet port 34. It then passes through dividing wall port 36 and into chamber 78. Because plug 52 is seated in dividing wall port 32, the fluid is precluded by positive shut off from entering compartment 76. Instead, it is discharged from compartment 78 through outlet port 46.

The multi port diverter valve described herein has several advantages. Because it has few moving parts, it is economically constructed and maintained. The valve housing is assembled from modular components or is cast as a unitary structure. Valve maintenance is facilitated since the valve is quickly and easily disassembled. It can be kept in service for long periods of time since the valve seats and plugs are the only parts which are subject to routine, periodic maintenance. However, because the seats and plugs are made from durable, long lasting elastomeric materials, their replacement is required on an infrequent basis. Moreover, when seat or plug replacement is required, repair time is minimized since these parts are readily accessible and removable. Tolerances between parts and alignment of parts are not a factor during maintenance activities. The configuration of the valve's parts lends to its increased operating efficiency. When the valve plug is seated, a tight seal is provided which completely protects against leakage between the primary and secondary equipment, thereby enhancing safety during maintenance of such equipment. Because of its simplisitic structure and operation, the valve described herein is readily automated, without additional modification, by any of a wide variety of standard actuators.

The invention has been described in detail with reference to a preferred embodiment thereof, However, it will be understood that variations and modifications can be effected within the spirit and scope of the invention. For example, the valve chambers need not be cylindrical, but can be of any suitable shape generally used in the art for diverter valves controlled by reciprocating stems.

I claim:

1. An automatable multi port diverter valve comprising
   (a) a fluid intake chamber having a side wall and two end covers, said chamber being separated into a first, second and third compartments by two dividing walls, wherein the first compartment is enclosed by one end cover, the side wall and a first dividing wall, the second compartment is enclosed by the side wall, the first dividing wall and a second dividing wall and the third compartment is enclosed by the second dividing wall, the side wall and the remaining end cover, each of said compartments having a port in its side wall and in each dividing wall;
   (b) a fluid discharge chamber comprising a side wall and two end covers, said chamber being separated into fourth, fifth and sixth compartments by two dividing walls wherein the fourth compartment is enclosed by one end cover, the side wall and a third dividing wall, the fifth compartment is enclosed by the side wall, the third dividing wall and a fourth dividing wall and the sixth compartment is enclosed by the fourth dividing wall, the side wall and the remaining end cover, each of said compartments having a port in its side wall and in its dividing wall;

(c) a single valve stem having one of its ends positioned outside of the end cover for the first compartment and its other end positioned within the fifth compartment, said valve stem extending through the first, second and third dividing walls and through each of the end covers for the first, third and fourth compartments;

(d) a first blocking element situated on the valve stem in the second compartment for controlling fluid flow through the ports in the second compartment's dividing walls; and (e) a second blocking element situated on the valve stem in the fifth compartment for controlling fluid flow through the ports in the fifth compartment's dividing walls;

wherein fluid flow through a port and through the compartment which is in communication with said port is completely blocked when a blocking element is seated in said port and wherein the blocking elements are positioned on the valve stem in relation to each other in a manner such that a compartment which is not in the path of fluid flow is disposed between compartments which are in the path of fluid flow.

2. The multi port diverter valve of claim 1 wherein each blocking element is a valve plug.

3. The multi port diverter valve of claim 2 wherein the valve plug is detachable from the valve stem.

4. The multi port diverter valve of claim 2 wherein the valve plug contains a body and tapered ends which are detachable from said body.

5. The multi port diverter valve of claim 1 wherein each dividing wall port contains a valve seat for each corresponding blocking element.

6. The multi port diverter valve of claim 5 wherein the valve seat is detachable from the dividing wall port.

* * * * *